United States Patent Office 3,822,231
Patented July 2, 1974

3,822,231
PRODUCTION OF POLYAMINO ACID SOLUTION IN ALCOHOLIC SOLVENTS
Yasuo Fujimoto, Yokohama, and Keizo Tatsukawa and Akio Matsunaga, Tokyo, Japan, assignors to Kyowa Hakko Co., Ltd., Tokyo, Japan
No Drawing. Filed Sept. 6, 1972, Ser. No. 286,748
Claims priority, application Japan, Sept. 6, 1971, 46/68,111; Feb. 24, 1972, 47/18,498
Int. Cl. C08g
U.S. Cl. 260—30.4 N      28 Claims

ABSTRACT OF THE DISCLOSURE

A unique polyamino acid solution is obtained by dissolving a polyamino acid in a solvent system containing at least one solvent selected from the group consisting of furfuryl alcohol, 1,3-dichloro-2-propanol, and 2,3-dichloro-1-propanol The present invention relates to a polyamino acid solution. More particularly, it relates to a polyamino acid solution having a solvent system containing furfuryl alcohol (hereinafter referred to as FA), 1,3-dichloro-2-porpanol (hereinafter referred to as 1,3-DCP) or 2,3-dichloro-1-propanol (hereinafter referred to as 2,3-DCP).

In this specification, the term "polyamino acids" includes homopolymers and copolymers of amino acids and/or derivatives thereof having a degree of polymerization of 50 to 5,000 and containing a repeating unit in the polymer molecule obtaining from the following monomers:

(1) ω-esters of acidic amino acids such as β-alkyl aspartate, γ-alkyl glutamate, etc. (wherein the alkyl group has 1 to 18 carbon atoms, preferably 1 to 8 carbon atoms and includes methyl, ethyl, propyl, butyl, pentyl, hexyl, heptyl and octyl).

(2) $N^\alpha$-substituted basic amino acids such as $N^\delta$-substituted ornithine, $N^\epsilon$-substituted lysine (wherein the substituents include aromatic acyl groups having 7 to 8 carbon atoms, alicyclic acyl groups having 4 to 8 carbon atoms, aliphatic acyl groups having 2 to 8 carbon atoms, these acyl groups being exemplified by benzoyl, cyclohexylcarbonyl, acetyl, propionyl, butyryl, pentanoyl, hexanoyl, heptanoyl, octanoyl, etc., and also include aromatic oxycarbonyl groups having 7 to 8 carbon atoms, alicyclic oxycarbonyl groups having 4 to 8 carbon atoms, aliphatic oxycarbonyl groups having 2 to 8 carbon atoms, these oxycarbonyl groups being exemplified by carbobenzoxy, cyclohexyloxycarbonyl, methoxycarbonyl, ethyloxycarbonyl, propyloxycarbonyl, butyloxycarbonyl, pentyloxycarbonyl, hexyloxycarbonyl, heptyloxycarbonyl, etc.), etc.

(3) neutral amino acids free of hydroxyl groups having 2 to 9 carbon atoms, such as glycine, valine, leucine, isoleucine, phenylalanine, methionine, etc. (the amino acids forming monomers (1) to (3) may be optically active or inactive) or (4) D-alanine or L-alanine.

Polyamino acids are used as a material for producing synthetic leathers in the form of a film or the like and synthetic fibers. They are also useful as a top-coating agent of natural and synthetic leathers.

These polyamino acids decompose upon heating and cannot exist in a melted state. Therefore, to produce shaped articles, a melt-shaping process cannot be employed and the shaping is inevitable effected by either a wet process or a dry process. Accordingly, in order to obtain shaped articles of polyamino acids, it is usually necessary to prepare a polyamino acid solution.

Polyamino acids which may be exemplified by poly-γ-methylglutamate are prepared by polymerizing amino acid N-carboxy anhydrides which are monomers in a suitable solvent such as, for example, ethylene dichloride. However, the polyamino acid solution after polymerization contains polymers having various degrees of polymerization and also unreacted monomers. Accordingly, it is often disadvantageous to use solution directly in the shaping processes.

Ethylene dichloride, ethylene dichloride-trichloroethylene, and ethylene dichloride-tetrachloroethylene are the solvents which are most commonly used for the polymerization reaction. Since these solvents are hydrophobic, when a polymerization solution of polyamino acids in any of these solvents is used for wet shaping, water cannot be used as a coagulating bath; although it is the most inexpensive and easiest bath to handle. Therefore, the use of an organic solvent such as ketones, alcohols, etc. is unavoidable.

Addition of hyrophilic solvents to the polyamino acid solution may be proposed so as to give a hydrophilic nature to the solution. However, since ordinary hydrophilic solvents are usually poor solvents for polyamino acids, the addition thereof often causes the precipitation of the polyamino acids.

When a polyamino acid solution is used as a topcoating agent, usually spray-coating is employed. In this case, in order to control the evaporation speed of the solvent, it is necessary to add, to the polyamino acid solution, other volatile solvents such as dioxane, N,N-dimethylformamide, ethyl acetate, toluene, methyl cellosolve acetate, dimethyl sulfoxide, N-methylpyrrolidone, butanol, methyl isobutyl ketone, etc. These volatile solvents are also poor solvents for polyamino acids and the addition thereof likewise may cause precipitation of polyamino acids.

Further, it is sometimes necessary to precipitate the polyamino acid out of the polymerization solution in order to control the distribution of the molecular weight and to remove impurities. However, once obtained as a precipitate, the polyamino acid is hardly soluble even in ethylene dichloride, ethylene dichloride-trichloroethylene or ethylene dichloride-tetrachloroethylene.

For these reasons, it has been desired to find a hydrophilic solvent for polyamino acids which is capable of highly dissolving polyamino acids and which, when a polyamino acid is dissolved in such a solvent, allows the addition of remarkable amounts of poor solvents for polyamino acids to the resultant polyamino acid solution without causing precipitation of the polyamino acids but at the same time with maintaining the mixed solvent system hydrophilic.

Heretofore, as hydrophilic solvents for polyamino acids, dichloroacetic acid, trifluoroacetic acid, ethylene chlorohydrin, etc. have been known. Dichloroacetic acid and trifluoroacetic acid readily dissolve solid polyamino acids. However, these solvents are not practical because they are highly corrosive and expensive. Ethylene chlorohydrin (Japanese Patent Publication No. 20,431/1964) dissolves polyamino acids at a concentration of only about 10%.

In an attempt to find a solvent which meets the above requirements, the present inventors previously have found that certain kinds of N-substituted heterocyclic compounds such as N-methyl-α-pyrrolidone, morpholine, etc. and certain kinds of aromatic alcohols, such as benzyl alcohols, etc. are useful (respectively U.S. application Ser. No. 813,308, filed on Apr. 3, 1969 and U.S. application Ser. No. 834,509, filed on June 18, 1969). However, these solvents are still unsatisfactory in that such solvents are not capable of highly dissolving polyamino acids at room temperature and that when a polyamino acid is dissolved in these solvents, it is not possible to add a large amount of hyrophobic solvents to the resultant polyamino acid solution.

It has now been found that FA, 1,3-DCP and 2,3-DCP can dissolve polyamino acids at a high concentration and a remarkable amount of poor solvents can be added to a polyamino acid solution in at least one of these solvents, without causing precipitation of the polyamino acids but at the same time with keeping the mixed solvent system hydrophilic. Further, similar effects can be expected when FA, 1,3-DCP or 2,3-DCP is added to a polyamino acid solution employing the conventional solvents. Furthermore, a solid polyamino acid once separated out of a polyamino acid solution can be again dissolved by adding FA, 1,3-DCP or 2,3-DCP.

Such a polyamino acid solution is exceedingly useful for shaping processes, for example, a wet-shaping process, dry-shaping process or spray-coating.

Accordingly, one object of the present invention is to provide a new polyamino acid solution.

Another object of the present invention is to provide a polyamino acid solution in a solvent system containing FA, 1,3-DCP, 2,3-DCP, or a mixture thereof.

A further object of the invention is to provide a polyamino acid solution in a mixed solvent system of FA, 1,3-DCP or 2,3-DCP, and poor solvents for polyamino acids.

A still further object of the invention is to provide a new polyamino acid solution in a hydrophilic solvent.

A still further object is to provide a polyamino acid solution suitable for a wet-shaping process, dry-shaping process and spray-coating.

A still further object is to provide a polyamino acid solution in which a solid polyamino acid is dissolved.

Yet another object is to provide a polyamino acid solution with which water may be used as a coagulating bath for the polyamino acid.

Other objects will become apparent from the detailed description given hereinbelow.

The polyamino acid solution according to the present invention may be prepared by adding FA, 1,3-DCP or 2,3-DCP to a solid polyamino acid and stirring at room temperature or with heating. Also the desired polyamino acid solution may be prepared by carrying out a polymerization reaction in one of these solvents. Alternatively the polyamino acid solution may be prepared by carrying out the polymerization reaction in other solvents, for example, ethylene dichloride and adding FA, 1,3-DCP or 2,3-DCP to the solution after the reaction while distilling off the solvent to effect substitution of the solvent. If the solvent of the polymerization reaction is allowable to be present in the desired solution, the desired polyamino acid solution can be prepared by simply admixing FA, 1,3-DCP or 2,3-DCP with the solution obtained after the polymerization. It will be recognized that the polyamino acid solution of the present invention is not limited to one that contains only one of FA, 1,3-DCP and 2,3-DCP, but the solution may contain a mixture of any two or all of these solvents.

FA, 1,3-DCP and 2,3-DCP dissolve solid polyamino acids which are rich in the α-helix structures obtained by adding poor solvents to a polymerization solution of a polyamino acid to precipitate the polyamid acid and by isolating the precipitate. FA, 1,3-DCP, and 2,3-DCP dissolve these solid polymers, respectively, at a concentration of 30%, 70% and 70% by weight at room temperature. (Unless otherwise noted, percent shows weight percent throughout the specification.) Further, it is a surprising fact that these three solvents can readily dissolve those solid polyamino acids which are rich in β-configurations induced by applying mechanical and thermal stresses to said solid polyamino acids, at a high concentration (e.g. FA 15%, 1,3-DCP 50%, and 2,3-DCP 50% at room temperature).

The thus-prepared polyamino acid solution in FA, 1,3-DCP or 2,3-DCP can be directly subjected to a wet or dry-shaping process or spray-coating. However, not only from the economical point of view but also from the reasons already mentioned, consideration must be given to provide improved properties to the polyamino acid solution by adding other solvents thereto without depending only on FA, 1,3-DCP and 2,3-DCP as a solvent. As mentioned above, FA, 1,3-DCP and 2,3-DCP can dissolve polyamino acid at a high concentration. Further, to the resultant solution can be added a large amount of hydrophilic solvents which are poor solvents for polyamino acids, such as methanol, ethanol, propanol, butanol, acetone, methyl ethyl ketone, etc. without causing the precipitation of polyamino acids. This means that when a polyamino acid is subjected to a wet film-forming process, the coagulation time can be controlled, resulting in an advantage in the industrial practice. In adding the above-described hydrophilic, poor solvents for polyamino acids to the polyamino acid solution in FA, 1,3-DCP or 2,3-DCP, the amount of addition may be determined depending upon the purpose of addition. The upper limit of addition varies depending upon the kind of the solvents of the solution, concentration of polyamino acid or kind of the poor solvents. In the case of a 10% FA, 1,3-DCP or 2,3-DCP solution of polyamino acid, usually the upper limit of poor solvent addition is 20 to 30% based on the weight of the solution. Especially, it is allowable to add up to 50% of methyl ethyl ketone, diacetone alcohol or dioxane to the 10% FA solution and up to 50% of ethanol, N,N-dimethylformamide or dimethyl sulfoxide to the 10% 1,3-DCP or 10% 2,3-DCP solution.

Tables 1 and 2 show the coagulation time when solutions of poly-γ-methyl-L-glutamate (intrinsic viscosity: 1.8 and molecular weight of 340,000), respectively, in FA and 1,3-DCP are coated on glass plates with a doctor blade having a thickness of 3 mils (3/1000 inches) and the coated layers are coagulated in water at 20° C.

TABLE 1

| Solution of poly-γ-methyl-L-glutamate | Coagulation time (seconds) |
|---|---|
| 30% in FA | 20 |
| 20% in FA | 20 |
| 10% in FA | 20 |
| 10% in FA+30% of methanol [1] | 15 |
| 10% in FA+30% of ethanol [1] | 15 |
| 10% in FA+30% of isopropanol [1] | 15 |
| 10% in FA+30% of dioxane [1] | 20 |

[1] Added based on the weight of the polyamino acid solution.

TABLE 2

| Solution of poly-γ-methyl-L-glutamate | Coagulation time (seconds) |
|---|---|
| 60% in 1,3-DCP | about 110 |
| 30% in 1,3-DCP | about 70 |
| 20% in 1,3-DCP | about 30 |
| 10% in 1,3-DCP | about 20 |
| 10% in 1,3-DCP+30% of ethanol [1] | about 20 |
| 10% in 1,3-DCP+20% of dioxane [1] | about 20 |

[1] See footnote 1, Table 1.

Tables 3 and 4 show the results when the poly-γ-methyl-L-glutamate (intrinsic viscosity: 1.8) is dissolved in FA and 1,3-DCP, respectively, to prepare solutions having polymer concentrations of 30%, 20%, 15% and 10% and the solutions are diluted with various hydrophilic solvents.

TABLE 3

| Solvent | Concentration of poly-γ-methyl-L-glutamate in FA | | | | Coagulation time* (seconds) |
|---|---|---|---|---|---|
| | 10% | 15% | 20% | 30% | |
| Methanol | △ | X | X | X | 15-20 |
| Ethanol | △ | X | X | X | 10-15 |
| Isopropanol | △ | X | X | X | 20-25 |
| t-Butanol | △ | X | X | X | 15-20 |
| Diacetone alcohol | O | △ | X | X | 15-20 |
| Methyl ethyl ketone | O | O | △ | X | 15-20 |
| Dioxane | O | O | △ | X | 20 |
| Tetrahydrofuran | △ | X | X | X | 15-20 |
| N,N-dimethylformamide | △ | X | X | X | 20 |
| Ethylene glycol | △ | X | X | X | 20-25 |
| Acetonitrile | △ | X | X | X | 15-20 |
| Dimethyl sulfoxide | O | △ | X | X | 15-20 |
| Acetone | O | X | X | X | 10-15 |

NOTE.—See footnotes at end of Table 4.

TABLE 4

| Solvent | Concentration of poly-γ-methyl-L-glutamate in FA | | | | Coagulation time* (seconds) |
|---|---|---|---|---|---|
| | 10% | 15% | 20% | 30% | |
| Methanol | △ | X | X | X | 15-20 |
| Ethanol | ○ | ○ | △ | X | 15-20 |
| Isopropanol | △ | X | X | X | 20-25 |
| t-Butanol | △ | X | X | X | 15-20 |
| Diacetone alcohol | △ | X | X | X | 15-20 |
| Methyl ethyl ketone | △ | △ | X | X | 15-20 |
| Dioxane | △ | △ | X | X | 15-20 |
| Tetrahydrofuran | △ | X | X | X | 15-20 |
| N,N-dimethylformamide | ○ | ○ | ○ | △ | 15-20 |
| Ethylene glycol | △ | X | X | X | 20-25 |
| Acetonitrile | △ | X | X | X | 15-20 |
| Dimethyl sulfoxide | ○ | △ | X | X | 15-20 |
| Acetone | △ | X | X | X | 10-15 |

*The coagulation time is measured when the 10% solution of poly-γ-methyl-L-glutamate is diluted to 7 to 8% with the hydrophilic solvent and coated on a glass plate with a doctor blade of 3 mils to form a coated layer, and the coated layer is subjected to coagulation in water at 20° C.
○ = Allowable to add 30% (in the case of the FA solution) or 50% (in the case of the 1,3-DCP solution) of the hydrophilic solvent based on the weight of the corresponding FA or 1,3-DCP solution to the FA or 1,3-DCP solution at the indicated concentrations.
△ = Slight gelation by the addition of 20 to 30% of the solvent.
X = Gelation or precipitation by the addition of 10 to 20% of the solvent.

Furthermore, it is possible to add a large amount of hydrophobic, poor solvents for polyamino acids to a polyamino acid solution in FA, 1,3-DCP or 2,3-DCP without causing the precipitation of polyamino acids. These hydrophobic, poor solvents include aromatic hydrocarbons which are relatively inexpensive and low in toxicity and also various other organic solvents. Exemplary of these solvents are benzene, toluene, xylene, ethyl acetate, butyl acetate, etc. That such hydrophobic poor solvents for polyamino acids can be added is advantageous in that, in applying a polyamino acid solution to natural and synthetic leathers, etc. by spraycoating, the evaporation speed of the solvent can be controlled. Further, the polyamino acid solution in FA, 1,3-DCP or 2,3-DCP is maintained hydrophilic even if such hydrophobic solvents are added in considerable amounts and can be subjected to a wet-shaping process using water or a solution containing water as a coagulating bath. In adding the above-described hydrophobic poor solvents to a polyamino acid solution in FA, 1,3-DCP or 2,3-DCP, the amount of addition is determined depending upon the purpose of the addition. The upper limit varies depending upon the kind of the solvent of polyamino acid solution, concentration of polyamino acid or kind of the poor solvents. In the case of a 10% FA, 1,3-DCP or 2,3-DCP solution of polyamino acid, usually the upper limit is 20 to 30% based on the weight of the solution. Surprisingly, it is allowable to add especially an aromatic solvent such as benzene, toluene, xylene, etc. in an amount of up to 20,000% (200 fold).

Tables 5 and 6 show the results when various hydrophobic solvents are added to 20%, 15% and 10% FA solutions and 30%, 20% and 10% 1,3-DCP solutions of poly-γ-methyl-L-glutamate (intrinsic viscosity: 1.5 and molecular weight of 280,000).

TABLE 5

| Solvent | Concentration of poly-γ-methyl-L-glutamate in FA | | | Coagulation time* (seconds) |
|---|---|---|---|---|
| | 10% | 15% | 20% | |
| Ethyl acetate | ○ | △ | X | 20-30 |
| Butyl acetate | ○ | △ | X | 20-30 |
| Amyl acetate | △ | X | X | 20-30 |
| Ethylene dichloride | ◎ | ◎ | ◎ | 20-30 |
| Tetrachloroethylene | ○ | ○ | ○ | 20-30 |
| Benzene | ◎ | ◎ | ◎ | 30 |
| Toluene | ◎ | ◎ | ◎ | 20-25 |
| Xylene | ◎ | ◎ | ◎ | 30 |
| Ethylene glycol monoethyl ether | △ | X | X | 20-30 |
| Ethylene glycol diethyl ether | △ | X | X | 30 |
| Ethylene glycol monoethyl ether acetate | △ | X | X | 30 |
| Ethylene glycol monomethyl ether acetate | △ | X | X | 30 |
| n-Hexane | △ | X | X | 30 |

Note.—See footnotes at end of Table 6.

TABLE 6

| Solvent | Concentration of poly-γ-methyl-L-glutamate in 1,3-DCP | | | Coagulation time* (seconds) |
|---|---|---|---|---|
| | 10% | 20% | 30% | |
| Ethyl acetate | △ | X | X | 20-30 |
| Butyl acetate | △ | X | X | 20-30 |
| Amyl acetate | X | X | X | 20-30 |
| Dichloroethane | ◎ | ◎ | ◎ | 20-30 |
| Tetrachloroethylene | ○ | △ | X | 20-30 |
| Benzene | ◎ | ◎ | ◎ | 30-35 |
| Toluene | ◎ | ◎ | ◎ | 30-35 |
| Xylene | ◎ | ◎ | ◎ | 30-35 |
| Ethylene glycol monoethyl ether | X | X | X | 20-30 |
| Ethylene glycol monoethyl ether acetate | X | X | X | 30-35 |
| Ethylene glycol monomethyl ether acetate | X | X | X | 30-35 |
| n-Hexane | X | X | X | 30-35 |

*The coagulation time is measured when the 10% solution of poly-γ-methyl-L-glutamate is diluted to 7 to 8% with the hydrophobic solvent and coated on a glass plate with a doctor blade of 3 mils to form a coated layer, and the coated layer is subjected to coagulation in water at 20° C.
◎ = Allowable to add up to 20,000% (200 fold) of the solvent based on the weight of FA or 1,3-DCP solution to the corresponding FA or 1,3-DCP solution.
○ = Allowable to add 30% (in the case of the FA solution) or 50% (in the case of the 1,3-DCP solution) of the solvent based on the weight of the corresponding FA or 1,3-DCP solution to the FA or 1,3-DCP solution at the indicated concentrations.
△ = Slight gelation by the addition of 20 to 30% of the solvent.
X = Gelation or precipitation by the addition of 10 to 20% of the solvent.

Similar results are obtained when 2,3-DCP is used in place of 1,3-DCP in Tables 4 and 6.

The conventional polyamino acid solution in halogenated hydrocarbons, such as ethylene dichloride, etc. has far larger specific gravity than water and therefore it has been difficult to prepare an emulsion of polyamino acids in water. In this respect, the polyamino acid solution according to the present invention overcomes the difficulty, since it allows the addition of various hydrophilic or hydrophobic solvents having a smaller specific gravity than water, without causing the precipitation of polyamino acids and therefore a polyamino acid solution having a specific gravity close to that of water can be prepared.

The hydrophilic and hydrophobic solvents shown in the foregoing tables are used for the preparation of pigment pastes for polymers. The additition of such a solvent to the conventional polyamino acid solution in halogenated hydrocarbons sometimes causes a considerable increase in the viscosity of the solution, involving problems in the shaping operation.

However, when the polyamino acid solution in FA, 1,3-DCP or 2,3-DCP according to the present invention is used, the addition of the hydrophilic or hydrophobic solvents shown in Tables 3 through 6 does not result in an increase in the viscosity of the solution and, on the contrary, rather shows a decrease in viscosity. Further, the increase in the viscosity of the solution caused by the addition of a pigment paste is slight and does not involve any problem in the shaping operation. This is also one of the characteristics of the polyamino acid solution of the present invention.

Usually the above-mentioned poor solvents for polyamino acids are added after the preparation of the polyamino acid solution in FA, 1,3-DCP or 2,3-DCP. However, in case the polymerization reaction to prepare polyamino acids is carried out in FA, 1,3-DCP or 2,3-DCP, it is possible to add such poor solvents before the polymerization reaction.

From the above description, it is understood that the polyamino acid solution according to the present invention is very advantageous for the shaping of polyamino acids.

The invention will be further understood from the following examples and are to be considered as merely illustrative and not limitative of the present invention. Obviously, various modifications are possible for those skilled in the art within the spirit of the present invention.

EXAMPLE 1

Three kinds of poly-γ-methyl-L-glutamate polymers having respective intrinsic viscosities of 1.0, 1.8 and 2.5 and containing almost no β-configurations are obtained by adding methanol separately to three kinds of ethylene dichloride solutions of the polymers having different degrees of polymerization and precipitating the polymers with minimum mechanical stress. (In each case, the intrinsic viscosity and reduced viscosity are measured at 20° C. by dissolving the polymers in dichloroacetic acid. This same measurement procedure is applicable to each of the following examples and to the preceding experiments.) Also, polymers of almost 100% β-configurations are obtained by preparing films from the three kinds of polayamino acid solutions by a dry process and stretching the films two fold. Further, polymers of about 50% β-configurations are obtained by pulverizing the three kinds of polymers containing almost no β-configurations to less than 40 meshes with a hammer mill-type grinder.

Each of these polymers is dissolved in FA at room temperature so that the polymer solutions respectively have concentrations shown in Table 7. The resultant solutions are coated on polished glass plates with a doctor blade having a thickness of 3 mils ($3/1000$ inches) to form polymer solution layers. Coagulation time is measured in water at 20° C. The results are shown in Table 7. Thus, from any of 9 kinds of polymer solutions in Table 7, a film of poly-γ-methyl-L-glutamate is obtained.

TABLE 7

| β-configurations, percent | Intrinsic viscosity | | | | | | | | |
|---|---|---|---|---|---|---|---|---|---|
| | 1.0 | | | 1.8 | | | 2.5 | | |
| | 0 | ca. 50 | ca. 100 | 0 | ca. 50 | ca. 100 | 0 | ca. 50 | ca. 100 |
| Concentration of the solution, percent | 25 | 20 | 15 | 15 | 12 | 10 | 10 | 8 | |
| Coagulation time (seconds) | 20 | 20 | 20 | 20 | 20 | 20 | 20 | 20 | 20 |

Example 2

9 g. of FA is added at room temperature to each of 1 g. of poly-γ-benzyl-D-glutamate having an intrinsic viscosity of 1.5, poly-γ-ethyl-L-glutamate having a reduced viscosity of 2.0 and poly-γ-butyl-L-glutamate having a reduced viscosity of 1.0 separately to dissolve the polymers. Films are obtained from the resultant solutions according to the procedure described in Example 1.

Example 3

9 g. of FA is added separately to each of 1 g. of poly-ε-carbobenzoxy-L-lysine (reduced viscosity: 2.0), poly-β-methyl-L-aspartate (reduced viscosity: 1.5), poly-L-leucine (reduced viscosity 2.4) and poly-L-alanine (reduced viscosity: 2.3), and the resultant mixtures are subjected to shaking and stirring at room temperature for about 8 hours. All of these polymers are completely dissolved. Films are obtained from these polymer solutions by coating the polymer solutions on glass plates with a doctor blade (thickness 3 mils) to form coated layers, coagulating in water at 20° C. and drying.

Example 4

9.5 g. of FA is added to each of 0.5 g. of copolymers, [(γ-methyl-L-glutamate and ε-carbobenzoxy-L-lysine 1:1), (γ-methyl-L-glutamate and L-leucine 1:1) and (β-methyl-L-aspartate and ε-carbobenzoxy-L-lysine 1:1)], and the resultant mixtures are subjected to stirring at room temperature for 8 to 24 hours. The respective copolymers are dissolved. Films are obtained according to the procedure described in Example 3.

Example 5

γ-methyl-D-glutamate-N-carboxy anhydride is charged into FA so as to make the polymer concentration after polymerization of 10%. Polymerization is carried out at a temperature of 20° C. using triethylamine as an initiator (the ratio of the monomer to the initiator=100 by mole). A poly-γ-methyl-D-glutamate solution having a reduced viscosity of 0.5 is obtained.

Example 6

A poly-γ-methyl-D-glutamate solution containing an excess FA in the solvent system is prepared by adding FA dropwise to a poly-γ-methyl-D-glutamate solution in ethylene dichloride while distilling off the solvent therefrom under reduced pressure.

The thus-prepared solution is coated on a glass plate with a doctor blade of 3 mils to form a polymer layer. The coated layer is coagulated in water at 20° C. and dried to obtain a film.

Example 7

10% FA solution of poly-γ-methyl-L-glutamate having an intrinsic viscosity of 1.8 is prepared. This solution is coated on polished glass plates with a doctor blade of 3 mils to form polymer layers and the coated layers are coagulated in coagulating baths respectively consisting of water and methanol (volume ratio 1:1), and water and acetone (volume ratio 1:1) at 25° C. After drying, transparent films are obtained.

Example 8

50 g., 100 g. and 2,000 g. each of benzene, toluene and xylene are added to each of 10 g. of 10% FA solutions of poly-γ-methyl-L-glutamate having an intrinsic viscosity of 1.8, whereby uniform, transparent solutions are obtained. The polymer is insoluble in benzene, toluene or xylene, singly, in the absence of FA. The solutions are subjected to coagulation in a coagulating bath of acetone-water system (volume ratio 1:1). After drying, films are obtained.

Example 9

γ-methyl-L-glutamate-N-carboxy anhydride is charged into solvent systems of FA-ethylene dichloride [(5:5) and (7.5:2.5), each ratio by weight] to make the respective polymer concentrations after polymerization of 10%. Polymerizations are carried out at a temperature of 20° C. using triethylamine as an initiator (the ratio of the monomer to the initiator=100 by mole). FA-ethylene dichloride solution of poly-γ-methyl-L-glutamate, each having a reduced viscosity of 0.8 and 0.6 are obtained.

Example 10

To 15% ethylene dichloride solution of poly-γ-methyl-L-glutamate having an intrinsic viscosity of 1.8 is added an equal amount of FA to obtain a homogeneous poly-amino acid solution. The solution is coated on a glass plate with a doctor blade having a thickness of 3 mils and the coated layer is coagulated in water at 20° C. After drying, a film is obtained.

Example 11

Three kinds of poly-γ-methyl-L-glutamate polymers having respective intrinsic viscosities of 1.0, 1.8 and 2.5 and containing almost no β-configurations are obtained by adding methanol separately to three kinds of ethylene dichloride solutions of the polymers having different degree of polymerization and precipitating the polymers with minimum mechanical stress. Also, polymers of almost 100% β-configurations are obtained by preparing films from the three kinds of polyamino acid solutions by a dry process and stretching the films two fold. Further, polymers of about 50% β-configurations are obtained by pulverizing the three kinds of polymers containing almost no β-configurations to less than 40 meshes with a hammer mill-type grinder.

Each of these polymers is dissolved in 1,3-DCP at room temperature so that the polymer solutions have concentrations shown in Table 8. The resultant solutions are coated on polished glass plates with a doctor blade having a thickness of 3 mils (3/1000 inches) to form polymer solution layers. Coagulation time is measured in water at 20° C. The results are shown in Table 8. From any of 9 kinds of polymer solutions in Table 8, a film of poly-γ-methyl-L-glutamate is obtained by a wet process.

tion is coated on polished glass plates with a doctor blade of 3 mils to form polymer layers and the coated layers are coagulated in coagulating baths respectively consisting of methanol and water (volume ratio 1:1), water and acetone (volume ratio 1:1) and methanol and water (volume ratio 2:8) at 25° C. After drying, transparent films are obtained.

Example 18

50 g., 100 g. and 2,000 g. each of benzene, toluene and xylene are added to each of 10 g. of 10% 1,3-DCP solu-

TABLE 8

| | Intrinsic viscosity | | | | | | | | |
|---|---|---|---|---|---|---|---|---|---|
| | 1.0 | | | 1.8 | | | 2.5 | | |
| β-configurations, percent | 0 | ca. 50 | ca. 100 | 0 | ca. 50 | ca. 100 | 0 | ca. 50 | ca. 100 |
| Concentration of the solution, percent | 70 | 60 | 50 | 60 | 45 | 40 | 45 | 40 | 35 |
| Coagulation time (seconds) | 90-110 | 120-130 | 140-150 | 100-110 | 125-140 | 150-160 | 110-120 | 130-140 | 180-190 |

Example 12

9 g. of 1,3-DCP is added at room temperature to each of 1 g. of poly-γ-benzyl-D-glutamate having an intrinsic viscosity of 1.5, poly-γ-ethyl-L-glutamate having a reduced viscosity of 2.0 and poly-γ-butyl-L-glutamate having a reduced viscosity of 1.0 separately to dissolve the polymers. Films are obtained from the resultant solutions according to the procedure described in Example 11.

Example 13

9 g. of 1,3-DCP is added separately to each of 1 g. of poly-ε-carbobenzoxy-L-lysine (reduced viscosity: 2.0), poly-β-methyl-L-aspartate (reduced viscosity: 1.5), poly-L-leucine (reduced viscosity: 2.4) and poly-L-alanine (reduced viscosity: 2.3), and the resultant mixtures are subjected to shaking and stirring at room temperature for about 12 hours. All of these polymers are completely dissolved. Films are obtained from these polymer solutions by coating the polymer solution on glass plates with a doctor blade (thickness: 3 mils) to form coated layers, coagulating in water at 20° C. and drying.

Example 14

9.5 g. of 1,3-DCP is added to each of 0.5 g. of co-polymers, [(γ-methyl - L - glutamate and ε-carbobenzoxy-L-lysine 1:1), (γ-methyl - L - glutamate and L-leucine 1:1) and (β-methyl - L - aspartate and ε-carbobenzoxy-L-lysine 1:1)], and the resultant mixtures are subjected to stirring at room temperature for 8 to 24 hours. The respective copolymers are dissolved. Films are obtained according to the procedure described in Example 13.

Example 15

γ-methyl - D - glutamate - N - carboxy anhydride is charged into a mixture of 1,3-DCP and 2,3-DCP (1:1) so as to make the polymer concentration after polymerization of 20%. Polymerization is carried out at a temperature of 20° C. using triethylamine as an initiator (the ratio of the monomer to the initiator=70 by mole). A poly-γ-methyl-D-glutamate solution having a reduced viscosity of 0.7 is obtained.

Example 16

A poly-γ-methyl - D - glutamate solution containing an excess 1,3-DCP in the solvent system is prepared by adding 1,3-DCP dropwise to a poly-γ-methyl-D-glutamate solution in ethylene dichloride while distilling off the solvent therefrom under reduced pressure.

The thus-prepared solution is coated on a glass plate with a doctor blade of 3 mils to form a polymer layer. The coated layer is coagulated in water at 20° C. and dried to obtain a film.

Example 17

10% 2,3-DCP solution of poly-γ-methyl-L-glutamate having an intrinsic viscosity of 1.8 is prepared. This solutions of poly-γ-methyl-L-glutamate having an intrinsic viscosity of 1.8, whereby uniform, transparent solutions are obtained. The polymer is insoluble in benzene, toluene or xylene singly in the absence of 1,3-DCP. These solutions are subjected to coagulation in a coagulating bath of acetone-water system (volume ratio 1:1). After drying, films are obtained.

Example 19

γ-methyl-L-glutamate-N-carboxy anhydride is charged into solvent systems of 1,3-DCP and ethylene dichloride [(5:5) and (7:3), each ratio by weight] to make the respective polymer concentrations after polymerization of 10%. Polymerizations are carried out at a polymerization temperature of 25° C. using triethylamine as an initiator (the ratio of the monomer to an initiator=80 by mole). 1,3-DCP-ethylene dichloride solutions of poly-γ-methyl-L-glutamate, each having a reduced viscosity of 0.9 and 0.7 are obtained.

Example 20

To 15% ethylene dichloride solution of poly-γ-methyl-L-glutamate having an intrinsic viscosity of 1.8 is added an equal amount of 1,3-DCP to obtain a homogeneous polyamino acid solution. The solution is coated on a glass plate with a doctor blade having a thickness of 3 mils and the coated layer is coagulated in water at 20° C. After drying, a film is obtained.

Examples 21 to 24

The procedures described in Examples 11 to 14 are repeated except that 2,3-DCP is used in place of 1,3-DCP. The results are similar to those obtained in Examples 11 to 14.

Example 25

20 g. and 50 g. each of toluene and xylene are added respectively to three polymer solutions prepared in Example 12, whereby uniform, transparent solutions are obtained. Films are obtained from these solutions according to the procedure described in Example 11.

Example 26

To each of 1 g. of poly-γ-benzyl-D-glutamate (intrinsic viscosity: 1.5), poly-γ-ethyl-L-glutamate (reduced viscosity: 2.0), and poly-γ-butyl-L-glutamate (reduced viscosity: 1.0) is added a mixed solvent of 4.5 g. of FA and 4.5 g. of 1,3-DCP. Each of the polymers is dissolved. Films are obtained from these solutions according to the procedure described in Example 1.

From the above-detailed description, it will be understood that the unique polyamino acid solutions of this invention are suitable for a wide variety of applications. Also, the suitable polyamino acids which have a degree of polymerization of about 50 to 5,000 may be further characterized as having molecular weight ranging from about 3,000 to about 1,000,000.

Furthermore, the polymer concentration of the polyamino acid solution may be up to about 70% by weight, based on the total weight of the solution.

What is claimed is:

1. A polyamino acid solution in a solvent system containing at least one solvent selected from the group consisting of furfuryl alcohol, 1,3-dichloro-2-propanol and 2,3-dichloro-1-propanol.

2. The polyamino acid solution of claim 1, wherein said solution contains 0.5 weight percent or more of said one solvent.

3. The polyamino acid solution of claim 1, wherein the concentration of said solution is up to about 70% by weight of polymer.

4. The polyamino acid solution of claim 2, wherein the polyamino acid is selected from the group consisting of homopolymers and copolymers of amino acids and derivatives of said amino acids having a degree of polymerization of 50 to 5,000, said amino acids or derivatives thereof being selected from the group consisting of $\omega$-alkyl and $\omega$-benzyl esters of acidic amino acids, the alkyl group having 1 to 8 carbon atoms, $N^{\alpha}$-substituted basic amino acids, the substituent being selected from aromatic acyl groups having 7 to 8 carbon atoms, alicyclic acyl groups having 4 to 8 carbon atoms, aliphatic acyl groups having 2 to 8 carbon atoms, aromatic oxycarbonyl groups having 7 to 8 carbon atoms, alicyclic oxycarbonyl groups having 4 to 8 carbon atoms and aliphatic oxycarbonyl groups having 2 to 8 carbon atoms, neutral amino acids free of hydroxyl groups containing from 2 to 9 carbon atoms, D-alanine and L-alanine.

5. The polyamino acid solution of claim 1, wherein the solvent system also contains a poor solvent for said polyamino acid.

6. The polyamino acid solution of claim 5, wherein said poor solvent is a hydrophilic solvent.

7. The polyamino acid solution of claim 5, wherein the poor solvent is a hydrophobic solvent.

8. A process for providing a new polyamino acid solution which comprises forming a polyamino acid solution in a solvent system containing at least one solvent selected from the group consisting of furfuryl alcohol, 1,3-dichloro-2-propanol and 2,3-dichloro-1-propanol.

9. The process of claim 8, wherein said solution contains 0.5 weight percent or more of said one solvent.

10. The process of claim 8, wherein the concentration of said solution is up to about 70% by weight of polymer.

11. The process of claim 9, wherein the polyamino acid is selected from the group consisting of homopolymers and copolymers of amino acids and derivatives of said amino acids having a degree of polymerization of 50 to 5,000, said amino acids or derivatives thereof being selected from the group consisting of $\omega$-alkyl and $\omega$-benzyl esters of acidic amino acids, the alkyl group having 1 to 8 carbon atoms, $N^{\alpha}$-substituted basic amino acids, the substituent being selected from aromatic acyl groups having 7 to 8 carbon atoms, alicyclic acyl groups having 4 to 8 carbon atoms, aliphatic acyl groups having 2 to 8 carbon atoms, aromatic oxycarbonyl groups having 7 to 8 carbon atoms, alicyclic oxycarbonyl groups having 4 to 8 carbon atoms and aliphatic oxycarbonyl groups having 2 to 8 carbon atoms, neutral amino acids free of hydroxyl groups containing from 2 to 9 carbon atoms, D-alanine and L-alanine.

12. The process of claim 8, wherein the solvent system also contains a poor solvent for said polyamino acid.

13. The process of claim 12, wherein said poor solvent is a hydrophilic solvent.

14. The process of claim 12, wherein the poor solvent is a hydrophobic solvent.

15. The process of claim 11, wherein said solution is prepared by adding said at least one solvent to a solid polyamino acid and stirring at room temperature.

16. The process of claim 11, wherein the polyamino acid solution is prepared by adding said at least one solvent to a solid polyamino acid and stirring with heating.

17. A process for forming a layer of a polyamino acid on a substrate which comprises forming a polyamino acid solution in a solvent system containing 0.5 wt. percent or more of at least one solvent selected from the group consisting of furfuryl alcohol, 1,3-dichloro-2-propanol and 2,3-dichloro-1-propanol, applying said solution to the substrate and thereafter removing the solvent system from said solution, said polyamino acid being selected from the group consisting of homopolymers and copolymers of amino acids and derivatives of said amino acids having a degree of polymerization of 50 to 5,000 and said amino acids or derivatives thereof being selected from the group consisting of $\omega$-alkyl and $\omega$-benzyl esters of acidic amino acids, the alkyl group having 1 to 8 carbon atoms, $N^{\alpha}$-substituted basic amino acids, the substituent being selected from aromatic acyl groups having 7 to 8 carbon atoms, alicyclic acyl groups having 4 to 8 carbon atoms, aliphatic acyl groups having 2 to 8 carbon atoms, aromatic oxycarbonyl groups having 7 to 8 carbon atoms, alicyclic oxycarbonyl groups having 4 to 8 carbon atoms and aliphatic oxycarbonyl groups having 2 to 8 carbon atoms, neutral amino acids free of hydroxyl groups containing from 2 to 9 carbon atoms, D-alanine and L-alanine.

18. The polyamino acid solution of claim 4, wherein said one solvent is 1,3-dichloro-2-propanol.

19. The polyamino acid solution of claim 4, wherein said one solvent is 2,3-dichloro-1-propanol.

20. The polyamino acid solution of claim 4, wherein said solvent system consists essentially of at least one solvent selected from the group consisting of furfuryl alcohol, 1,3-dichloro-2-propanal and 2,3-dichloro-1-propanol.

21. The polyamino acid solution of claim 20, wherein said solution has a concentration up to about 70% by weight of said polyamino acid.

22. The process of claim 11, wherein said one solvent is 1,3-dichloro-2-propanol.

23. The process of claim 11, wherein said one solvent is 2,3-dichloro-1-propanol.

24. The process of claim 11, wherein said solvent system consists essentially of at least one solvent selected from the group consisting of furfuryl alcohol, 1,3-dichloro-2-propanol and 2,3-dichloro-1-propanol.

25. The process of claim 11, wherein said solution has a concentration up to about 70% by weight of said polyamino acid.

26. The process of claim 17, wherein said one solvent is 1,3-dichloro-2-propanol.

27. The process of claim 17, wherein the one solvent is 2,3-dichloro-1-propanol.

28. The process of claim 17, wherein said polyamino acid solution has a concentration up to about 70% by weight of said polyamino acid.

References Cited

UNITED STATES PATENTS

| | | | |
|---|---|---|---|
| 3,369,026 | 2/1968 | Iwatsuki | 260—307 |
| 3,554,944 | 1/1971 | Helm | 260—18 |
| 3,679,638 | 7/1972 | Helmuth | 260—78 S |
| 3,089,749 | 4/1963 | Ballard | 18—54 |
| 3,006,899 | 10/1961 | Hill | 260—78 |
| 2,882,186 | 4/1959 | Schoenberg | 117—161 |

OTHER REFERENCES

Solubility Parameters for Film Formers, Burrell, pp. 726–727 and pp. 740–751, 1955.

Technology of Paints, Reinhold, New York, 1968, pp. 286–291.

ALLAN LIEBERMAN, Primary Examiner

R. ZAITLEN, Assistant Examiner

U.S. Cl. X.R.

260—33.4 R